(12) United States Patent
Azami (10) Patent No.: US 11,824,192 B2
(45) Date of Patent: Nov. 21, 2023

(54) LITHIUM ION SECONDARY BATTERY

(71) Applicant: NEC CORPORATION, Tokyo (JP)

(72) Inventor: Takeshi Azami, Tokyo (JP)

(73) Assignee: NEC CORPORATION, Tokyo (JP)

(*) Notice: Subject to any disclaimer, the term of this patent is extended or adjusted under 35 U.S.C. 154(b) by 663 days.

(21) Appl. No.: 16/760,791

(22) PCT Filed: Oct. 31, 2018

(86) PCT No.: PCT/JP2018/040515
§ 371 (c)(1),
(2) Date: Apr. 30, 2020

(87) PCT Pub. No.: WO2019/088171
PCT Pub. Date: May 9, 2019

(65) Prior Publication Data
US 2020/0328418 A1    Oct. 15, 2020

(30) Foreign Application Priority Data

Nov. 1, 2017 (JP) .................................. 2017-211633

(51) Int. Cl.
*H01M 4/525* (2010.01)
*H01M 4/131* (2010.01)
(Continued)

(52) U.S. Cl.
CPC ........... *H01M 4/525* (2013.01); *H01M 4/131* (2013.01); *H01M 4/1391* (2013.01);
(Continued)

(58) Field of Classification Search
CPC .... H01M 4/525; H01M 4/131; H01M 4/1391; H01M 4/366; H01M 4/505; H01M 4/623;
(Continued)

(56) References Cited

U.S. PATENT DOCUMENTS

2011/0256437 A1* 10/2011 Katsuki ................. H01M 4/525
429/94
2015/0349332 A1   12/2015 Azami et al.
(Continued)

FOREIGN PATENT DOCUMENTS

CN     102017247 A    4/2011
CN     103515612 A    1/2014
(Continued)

OTHER PUBLICATIONS

Machine translation of JP 2014-007088 A (Mitani) (Year: 2014).*
(Continued)

*Primary Examiner* — Kwang Han
(74) *Attorney, Agent, or Firm* — Sughrue Mion, PLLC (57) ABSTRACT

A purpose of the present invention is to provide a lithium ion secondary battery having more improved life characteristics while suppressing gelation of an electrode mixture slurry in a manufacturing process. The lithium ion secondary battery according to the present invention comprises a positive electrode having a positive electrode mixture layer comprising a layered lithium-nickel composite oxide in which a proportion of nickel in metals other than lithium is 80 mol % or more; LiOH; $Li_2CO_3$; and a chlorine-containing polyvinylidene fluoride-based polymer, wherein a content of LiOH in the positive electrode mixture layer and a content of $Li_2CO_3$ in the positive electrode mixture layer are each 0.1 weight % or more and 2.1 weight % or less, a total content of LiOH and $Li_2CO_3$ in the positive electrode mixture layer is 0.2 weight % or more and 4.2 weight % or less, and a content of chlorine in the positive electrode mixture layer is 30 μg/g or more and 120 μg/g or less.

15 Claims, 1 Drawing Sheet

(51) Int. Cl.
  *H01M 4/1391* (2010.01)
  *H01M 4/36* (2006.01)
  *H01M 4/62* (2006.01)
  *H01M 10/0525* (2010.01)
  *H01M 4/02* (2006.01)
  *H01M 4/505* (2010.01)

(52) U.S. Cl.
  CPC .......... *H01M 4/366* (2013.01); *H01M 4/505* (2013.01); *H01M 4/623* (2013.01); *H01M 4/625* (2013.01); *H01M 10/0525* (2013.01); *H01M 2004/021* (2013.01); *H01M 2004/028* (2013.01); *H01M 2220/20* (2013.01); *Y02E 60/10* (2013.01)

(58) Field of Classification Search
  CPC .......... H01M 4/625; H01M 10/0525; H01M 2004/021; H01M 2004/028; H01M 2220/20; H01M 10/052; Y02E 60/10; Y02P 70/50
  See application file for complete search history.

(56) References Cited

U.S. PATENT DOCUMENTS

| | | | | |
|---|---|---|---|---|
| 2017/0179470 | A1* | 6/2017 | Choi | ................... H01M 4/485 |
| 2018/0013169 | A1* | 1/2018 | Kawasaki | ............. H01M 50/44 |
| 2018/0175449 | A1 | 6/2018 | Iriyama et al. | |

FOREIGN PATENT DOCUMENTS

| | | | | |
|---|---|---|---|---|
| CN | 103915620 | A | 7/2014 | |
| CN | 104919629 | A | 9/2015 | |
| CN | 106997948 | A | 8/2017 | |
| JP | 2002-222651 | A | 8/2002 | |
| JP | 2004-087325 | A | 3/2004 | |
| JP | 2010-192438 | A | 9/2010 | |
| JP | 2011-124086 | A | 6/2011 | |
| JP | 2011129442 | A * | 6/2011 | ............ H01M 4/131 |
| JP | 2013-131392 | A | 7/2013 | |
| JP | 2013-235698 | A | 11/2013 | |
| JP | 2014-007088 | A | 1/2014 | |
| JP | 2016-134218 | A | 7/2016 | |
| KR | 10-2017-0045910 | A | 4/2017 | |
| WO | 2014/109406 | A1 | 7/2014 | |
| WO | WO2016093246 | A * | 6/2016 | .......... H01M 10/052 |
| WO | 2016/181926 | A1 | 11/2016 | |

OTHER PUBLICATIONS

Machine translation of JP 2016-134218 A (Ishikawa) (Year: 2016).*
Machine translation of JP2011129442A, Yamaki Takahiro (Year: 2011).*
International Search Report for PCT/JP2018/040515 dated Dec. 11, 2018 (PCT/ISA/210).
Chinese Office Action for CN Application No. 201880070724.X dated Aug. 25, 2022 with English Translation.
Chinese Office Action for CN Application No. 201880070724.X, dated May 16, 2023 with English Translation.

* cited by examiner

LITHIUM ION SECONDARY BATTERY

CROSS REFERENCE TO RELATED APPLICATIONS

This application is a National Stage of International Application No. PCT/JP2018/040515 filed Oct. 31, 2018, claiming priority based on Japanese Patent Application No. 2017-211633, filed Nov. 1, 2017.

TECHNICAL FIELD

The present invention relates to a lithium ion secondary battery and a manufacturing method thereof.

BACKGROUND ART

A poly(vinylidene fluoride)-based polymer is generally used in an electrode of a lithium ion secondary battery. In the manufacture of a lithium ion secondary battery, a binder and an active material are mixed in an organic solvent to prepare an electrode mixture slurry. At this time, when the poly(vinylidene fluoride)-based polymer is used as a binder, the electrode mixture slurry tends to gel. For this reason, it becomes difficult to apply the electrode mixture slurry to a current collector, and the productivity and performance of the electrode deteriorate. It is thought that cross-linking between polyene structures is one of the causes of the gelation, because the poly(vinylidene fluoride)-based polymer easily forms polyene structures due to dehydrofluorination. In particular, lithium-nickel composite oxides, which are known as positive electrode active materials having high capacity, contain alkaline components and tend to increase the viscosity of the electrode mixture slurry when mixed with the poly(vinylidene fluoride)-based polymer, and this has been problematic. It is known to use a blend of a chlorine-free poly(vinylidene fluoride)-based polymer and a chlorine-containing polyvinylidene fluoride-based polymer as a binder to improve this problem. Patent Document 1 discloses that a binder prepared by mixing 100 parts by weight of poly(vinylidene fluoride) and 5 to 30 parts by weight of vinylidene fluoride-chlorotrifluoroethylene copolymer is used to ensure the adhesiveness of the binder to a current collector with preventing the gelation of the electrode mixture slurry.

CITATION LIST

Patent Literature

Patent Document 1; Japanese patent laid-open No. 2013-235698

SUMMARY OF INVENTION

Technical Problem

However, the use of the binder comprising the chlorine-containing polyvinylidene fluoride-based polymer as described in Patent Document 1 has had a problem in that it deteriorates aging efficiency and battery life characteristics, such as cycle characteristics, as compared with a binder consisting of only a chlorine-free polyvinylidene fluoride-based polymer. In view of the above mentioned problem, a purpose of the present invention is to provide a lithium ion secondary battery having more improved life characteristics while suppressing the gelation of the electrode mixture slurry in a manufacturing process caused by the use of a binder comprising the chlorine-containing polyvinylidene fluoride-based polymer.

Solution to Problem

The first lithium ion secondary battery according to the present invention comprises a positive electrode having a positive electrode mixture layer comprising a layered lithium-nickel composite oxide in which a proportion of nickel in metals other than lithium is 80 mol % or more; LiOH; $Li_2CO_3$; and a chlorine-containing polyvinylidene fluoride-based polymer,
wherein a content of LiOH in the positive electrode mixture layer and a content of $Li_2CO_3$ in the positive electrode mixture layer are each 0.1 weight % or more and 2.1 weight % or less, a total content of LiOH and $Li_2CO_3$ in the positive electrode mixture layer is 0.2 weight % or more and 4.2 weight % or less, and a content of chlorine in the positive electrode mixture layer is 30 µg/g or more and 120 µg/g or less.

Advantageous Effects of Invention

According to the present invention, it is possible to provide a lithium ion secondary battery which has improved life characteristics.

DESCRIPTION OF EMBODIMENTS

Hereinafter, one example of the lithium ion secondary battery of the present embodiment will be described for each component.

<Positive Electrode>

The positive electrode comprises a current collector and a positive electrode mixture layer comprising a positive electrode active material and a binder. In the present embodiment, the positive electrode mixture layer further comprises LiOH and $Li_2CO_3$.

In the present embodiment, the positive electrode active material comprises a layered lithium-nickel composite oxide in which the proportion of nickel in metals other than lithium is 80 mol % or more. Examples of a preferred layered lithium-nickel composite oxide include those represented by the following formula (1).

$$Li_yNi_{(1-x)}M_xO_2 \quad (1)$$

wherein $0 \leq x \leq 0.2$, $0 < y \leq 1.2$, and M is at least one element selected from the group consisting of Co, Al, Mn, Fe, Ti, and B.

In formula (1), M is preferably at least one element selected from the group consisting of Co, Al and Mn. Examples of such compounds include $Li_\alpha Ni_\beta Co_\gamma Mn_\delta O_2$ ($0<\alpha \leq 1.2$, preferably $1 \leq \alpha \leq 1.2$, $\beta+\gamma+\delta=1$, $\beta \geq 0.8$, and $\gamma \leq 0.2$) and $Li_\alpha Ni_\beta Co_\gamma Al_\delta O_2$ ($0<\alpha \leq 1.2$, preferably $1 \leq \alpha \leq 1.2$, $\beta+\gamma+\delta=1$, $\beta \geq 0.8$, and $\gamma \leq 0.2$). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, $LiNi_{0.8}Co_{0.1}Al_{0.1}O_2$, $LiNi_{0.85}Co_{0.05}Al_{0.05}Mn_{0.05}O_2$ and the like may be preferably used.

Other positive electrode active materials may be also used together with the above layered lithium-nickel composite oxide in which the proportion of nickel in metals other than lithium is 80 mol % or more. Examples of other positive electrode active materials include $LiMnO_2$; lithium manganate having a layered structure or a spinel structure such as $Li_xMn_2O_4$ (0<x<2); $LiCoO_2$ or materials in which a part of the transition metal in this material is replaced by other metal(s); materials in which Li is excessive as compared with the stoichiometric composition in these lithium transition metal oxides; materials having an olivine structure such as $LiFePO_4$; and the like. In addition, materials in which these metal oxides have been partially substituted by Al, Fe, P, Ti, Si, Pb, Sn, In, Bi, Ag, Ba, Ca, Hg, Pd, Pt, Te, Zn, La or the like are also usable.

Also, a layered lithium-nickel composite oxide in which the proportion of nickel in metals other than lithium is less than 80 mol % may be used together with the above layered lithium-nickel composite oxide in which the proportion of nickel in metals other than lithium is 80 mol % or more. For example, compounds in which particular transition metals do not exceed half may be used. Examples of such compounds include $Li_\alpha Ni_\beta Co_\gamma Mn_\delta O_2$ (0<α≤1.2, preferably 1≤α≤1.2, β+γ+δ=1, 0.2≤β≤0.5, 0.1≤γ≤0.4, and 0.1≤δ≤0.4). More specific examples may include $LiNi_{0.4}Co_{0.3}Mn_{0.3}O_2$ (abbreviated as NCM433), $LiN_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including those in which the content of each transition metal fluctuates by about 10% in these compounds).

In the positive electrode mixture layer, the content of the layered lithium-nickel composite oxide in which the proportion of nickel in metals other than lithium is 80 mol % or more is preferably 50 weight % or more, more preferably 80 weight % or more, and particularly preferably 90 weight % or more. In the positive electrode mixture layer, the content of the layered lithium-nickel composite oxide in which the proportion of nickel in metals other than lithium is 80 mol % or more is preferably 99 weight % or less.

In the present embodiment, the binder comprises a chlorine-containing polyvinylidene fluoride-based polymer. When mixed with the positive electrode active material to prepare the positive electrode mixture slurry, the chlorine-containing polyvinylidene fluoride-based polymer can prevent the gelation of the slurry as compared to a chlorine-free polyvinylidene fluoride-based polymer. Examples of the chlorine-containing polyvinylidene fluoride-based polymer include polymers in which part of a homopolymer of vinylidene fluoride (polyvinylidene fluoride) or a copolymer of vinylidene fluoride and another monomer is replaced with chlorine. Examples of the copolymerizable monomer components other than vinylidene fluoride include alkenes such as ethylene and propylene. The alkene may be substituted with fluorine. Examples of such a compound include hexafluoropropylene, tetrafluoroethylene, trifluoroethylene, vinyl fluoride and the like.

Among these, the chlorine-containing polyvinylidene fluoride-based polymer is preferably a copolymer of vinylidene fluoride and a chlorine-containing monomer. The chlorine-containing monomer is preferably an alkene comprising fluorine along with chlorine. Examples of such a compound include chlorofluoroethylenes such as chlorotrifluoroethylene, chlorofluoropropene such as 1-chloro-3,3,3-trifluoro-1-propene, and the like. In the present embodiment, vinylidene fluoride-chlorotrifluoroethylene copolymer is particularly preferably used as the chlorine-containing polyvinylidene fluoride-based polymer.

The present inventors have found that the deterioration of battery life characteristics can be prevented as long as the content of chlorine is reduced to a predetermined range, even if the chlorine-containing polyvinylidene fluoride-based polymer is used as a binder. For this reason, in the present embodiment, the content of chlorine in the positive electrode mixture layer is 30 μg/g or more and 120 μg/g or less. When the content of chlorine in the positive electrode mixture layer is 30 μg/g or more, the gelation of the positive electrode mixture slurry can be prevented. Furthermore, when the content of chlorine in the positive electrode mixture layer is 120 μg/g or less, life characteristics of the lithium ion secondary battery can be improved. The upper limit of the content of chlorine in the positive electrode mixture layer is preferably 110 μg/g or less, and more preferably 90 μg/g or less. The lower limit of the content of chlorine in the positive electrode mixture layer is preferably 40 μg/g or more, and more preferably 60 μg/g or more.

The content of chlorine in the chlorine-containing polyvinylidene fluoride-based polymer is not particularly limited as long as the content of chlorine is within the above range. In general, the content of chlorine in the chlorine-containing polyvinylidene fluoride-based polymer is 0.1 weight % or more and 90 weight % or less, and preferably 1 weight % or more and 10 weight % or less. When a copolymer of vinylidene fluoride and a chlorine-containing monomer is used, the content of chlorine depends on the copolymerization ratio of the monomers. For example, in the case of vinylidene fluoride-chlorotrifluoroethylene copolymer, when the total amount of units derived from vinylidene fluoride and units derived from chlorotrifluoroethylene is 100 mol %, the percentage of the units derived from chlorotrifluoroethylene is preferably 5 mol % or more and 50 mol % or less, and more preferably 1 mol % or more and 15 mol % or less. Vinylidene fluoride-chlorotrifluoroethylene copolymer having such a copolymerization ratio is suitable for the binder.

The addition amount of the chlorine-containing polyvinylidene fluoride-based polymer is determined according to the content of chlorine in the chlorine-containing polyvinylidene fluoride-based polymer so as to set the content of chlorine in the positive electrode mixture layer in the above range. In one embodiment, the content of the chlorine-containing polyvinylidene fluoride-based polymer in the positive electrode mixture layer is preferably 0.01 weight % or more and 1 weight % or less, more preferably 0.05 weight % or more and 0.8 weight % or less, and still more preferably 0.1 weight % or more and 0.5 weight % or less.

Binders other than the chlorine-containing polyvinylidene fluoride-based polymer may be further used. In one embodiment, the chlorine-containing polyvinylidene fluoride-based polymer and the chlorine-free polyvinylidene fluoride-based polymer may be combined and used in the binder. The content of chlorine in the positive electrode mixture layer can be adjusted by adding the chlorine-free polyvinylidene fluoride-based polymer. Examples of the chlorine-free polyvinylidene fluoride-based polymer include homopolymer of vinylidene fluoride (polyvinylidene fluoride) or copolymer of vinylidene fluoride and another monomer. Examples of another monomer include alkenes such as ethylene and propylene. The alkene may be substituted with fluorine. Examples of such a compound include hexafluoropropylene, tetrafluoroethylene, trifluoroethylene, vinyl fluoride and the like.

To increase the energy density of the battery, the total amount of the chlorine-containing polyvinylidene fluoride-based polymer and the chlorine-free polyvinylidene fluoride-based polymer in the positive electrode mixture layer is preferably 4 weight % or less, and more preferably 2.5 weight % or less. Also, to give enough binding strength, the total amount of the chlorine-containing polyvinylidene fluoride-based polymer and the chlorine-free polyvinylidene fluoride-based polymer in the positive electrode mixture layer is preferably 0.5 weight % or more, and more preferably 1 weight % or more.

In the present embodiment, the positive electrode mixture layer comprises LiOH and $Li_2CO_3$. The content of LiOH in the positive electrode mixture layer and the content of $Li_2CO_3$ in the positive electrode mixture layer are each preferably 0.1 weight % or more, and more preferably 0.2 weight % or more. The content of LiOH in the positive electrode mixture layer and the content of $Li_2CO_3$ in the positive electrode mixture layer are each preferably 2.1 weight % or less, and more preferably 1.5 weight % or less. The total content of LiOH and $Li_2CO_3$ in the positive electrode mixture layer is preferably 0.2 weight % or more, and more preferably 0.4 weight % or more. The total content of LiOH and $Li_2CO_3$ in the positive electrode mixture layer is preferably 4.2 weight % or less, and more preferably 3 weight % or less. These alkali components are used as raw materials of the lithium-nickel composite oxide. For this reason, the lithium-nickel composite oxide generally comprises these alkali components in a small amount. The content of the alkali components can be adjusted by a production method and conditions. Also, the content of the alkali components can be adjusted by water washing. When the alkali components are present in excess, they react with the polyvinylidene fluoride-based polymer, causing an increase in the viscosity of the positive electrode mixture slurry. On the other hand, when the alkali components are substantially absent, the positive electrode mixture slurry has relatively low viscosity characteristics immediately after preparation, but may gradually increase in viscosity. By adjusting the content of the alkali components within the above range, the gelation of the positive electrode mixture slurry can be prevented.

For the positive electrode mixture layer, a conductive assisting agent may be added for the purpose of lowering the impedance. Examples of the conductive assisting agent include, flake-like and fibrous carbon fine particles and the like, for example, plate-like graphite, carbon nanotube, carbon nanohorn, carbon black, acetylene black, ketjenblack, vapor grown carbon fibers and the like. The content of the conductive assisting agent in the positive electrode mixture layer is preferably 0.01 weight % or more and 5 weight % or less, and more preferably 0.03 weight % or more and 2.5 weight % or less.

The conductive assistant agent preferably has a specific surface area and an average primary particle size suitable for a type thereof. The specific surface area may be determined by BET method. The average primary particle size represents a particle size at 50% in a volumetric based cumulative distribution (50% particle size). The average primary particle size can be measured by a laser diffraction type particle size distribution measuring apparatus.

The carbon black is carbon fine particles produced by pyrolysis of hydrocarbons. The carbon black forms a structure in which a plurality of primary particles is bonded. The average primary particle size of the carbon black is preferably 20 nm or more and 80 nm or less. The specific surface area of the carbon black is preferably 25 $m^2/g$ or more and 400 $m^2/g$ or less. The amount of the carbon black in the positive electrode mixture layer is preferably 0.1 weight % or more and 2.0 weight % or less.

The carbon nanotube has either a single layer or a coaxial multilayered structure, in which a planar graphene sheet having 6-membered rings of carbon are formed into a cylindrical shape, and has preferably a multilayered structure. Also, both ends of the cylindrical carbon nanotube may be open, but are preferably closed with hemispherical fullerene containing 5-membered rings or 7-membered rings of carbon. The average diameter of the outermost cylinders of the carbon nanotubes is preferably 5 nm or more and 40 nm or less. The specific surface area of the carbon nanotubes is preferably 100 $m^2/g$ or more and 400 $m^2/g$ or less. The amount of the carbon nanotubes in the positive electrode mixture layer is preferably 0.03 weight % or more and 2.0 weight % or less. The average diameter of the carbon nanotubes is an arithmetic average value of diameters that are measured with a transmission electron microscope.

The plate-like graphite can be produced by pulverizing massive graphite. The average primary particle size of the plate-like graphite is preferably 1 μm or more and 6 μm or less. The specific surface area of the plate-like graphite is preferably 10 $m^2/g$ or more and 40 $m^2/g$ or less. The amount of the plate-like graphite in the positive electrode mixture layer is preferably 0.03 weight % or more and 2.0 weight % or less.

The ketjenblack is one of the carbon black and has a high specific surface area and high conductivity. The average primary particle size of the ketjenblack is preferably 35 nm or more and 45 nm or less. The specific surface area of the ketjenblack is preferably 750 $m^2/g$ or more and 850 $m^2/g$ or less. The amount of the ketjenblack in the positive electrode mixture layer is preferably 0.1 weight % or more and 2.0 weight % or less.

As the positive electrode current collector, from the view point of electrochemical stability, aluminum, nickel, copper, silver, and alloys thereof are preferred. As the shape thereof, foil, flat plate, mesh and the like are exemplified. In particular, a current collector with aluminum, an aluminum alloy, or iron-nickel-chromium-molybdenum based stainless steel is preferable.

The positive electrode of the present embodiment may be produced, for example, by preparing a positive electrode mixture slurry comprising the positive electrode active material, the binder and a solvent, and applying this onto the positive electrode current collector to form the positive electrode mixture layer. Examples of a method of forming the positive electrode mixture layer include a doctor blade method, a die coater method, a CVD method, a sputtering method, and the like. After forming the positive electrode mixture layer in advance, a thin film of aluminum, nickel or an alloy thereof as a positive electrode current collector may be formed thereon by a method such as vapor deposition or sputtering.

To improve the energy density, a step for pressing the positive electrode is preferably provided after the positive electrode mixture layer is formed. The lower limit of the density of the positive electrode mixture layer is preferably 3.45 $g/cm^3$ or more, and more preferably 3.6 $g/cm^3$ or more. The upper limit of the density of the positive electrode mixture layer is preferably 4.0 $g/cm^3$ or less, and more preferably 3.8 $g/cm^3$ or less.

<Negative Electrode>

The negative electrode comprises a current collector and a negative electrode mixture layer comprising a negative electrode active material and a binder.

The negative electrode active material is not particularly limited. Examples thereof include carbon materials capable of absorbing and desorbing lithium ions (a), metals capable of being alloyed with lithium (b), and metal oxides capable of absorbing and desorbing lithium ions (c).

As the carbon material (a), graphite, amorphous carbon, diamond-like carbon, carbon nanotubes, or composites thereof can be used. Graphite having high crystallinity has high electrical conductivity and has excellent adhesiveness to a negative electrode current collector formed of a metal, such as copper, and excellent voltage flatness. On the other hand, in amorphous carbon having low crystallinity, the volume expansion is relatively small, and therefore, the effect of relieving the volume expansion of the entire negative electrode is large, and deterioration caused by nonuniformity, such as grain boundaries and defects, does not occur easily. The carbon material (a) can be used alone or in combination with other materials.

As the metal (b), a metal mainly composed of Al, Si, Pb, Sn, Zn, Cd, Sb, In, Bi, Ag, Ba, Ca, Hg, Pd, Pt, Te, La, and the like, or alloys of two or more of these, or alloys of these metals or alloys with lithium, or the like can be used. Particularly, the metal (b) preferably comprises silicon (Si). The metal (b) may be used alone or in combination with other materials.

As the metal oxide (c), silicon oxide (for example, SiO and $SiO_2$), aluminum oxide, tin oxide (for example, SnO and $SnO_2$), indium oxide, zinc oxide, lithium oxide, $LiFe_2O_3$, $WO_2$, $MoO_2$, CuO, $Nb_3O_5$, $Li_xTi_{2-x}O_4$ ($1 \leq x \leq 4/3$), $PbO_2$, $Pb_2O_5$ or composites thereof can be used. Particularly, the metal oxide (c) preferably comprises silicon oxide. This is because silicon oxide is relatively stable and does not easily cause reactions with other compounds. In addition, one or two or more elements selected from nitrogen, boron, and sulfur can also be added to the metal oxide (c), for example, in an amount of 0.1 to 5% by weight. By doing this, the electrical conductivity of the metal oxide (c) may be improved. The metal oxide (c) may be used alone or in combination with other materials.

Among these, silicon materials (materials comprising silicon, such as Si, silicon alloys, silicon oxides) having large capacity are particularly preferred as the negative electrode active materials. In one embodiment, the silicon material may be used in combination with a carbon material such as graphite. The silicon materials largely expand and contract at the time of insertion and desorption of Li, and thereby electrical contact between active materials may be broken in some cases. The use of the carbon material together with the silicon material makes it possible to maintain the electrical contact, leading to a battery with excellent cycle characteristics and high energy density. Silicon material particles and carbon material particles may be mixed and used, and surfaces of silicon material particles may be coated with the carbon material and used. The content of the silicon material is preferably 10 weight % or more, more preferably 30 weight % or more, still more preferably 70 weight % or more, and may even be 100 weight %, based on the total amount of the negative electrode active material. The 50% particle size of the silicon material is preferably 0.1 µm or more and 10 µm or less, and more preferably 0.2 µm or more and 8 µm or less. When the particle size is too small, the reactivity with the electrolyte solution may be increased, causing drop in life characteristics. When the particle size is too large, the particles easily crack at the time of insertion and desorption of Li, and the lifespan may be decreased.

The negative electrode binder is not particularly limited, and polyvinylidene fluoride (PVdF), vinylidene fluoride-hexafluoropropylene copolymer, vinylidene fluoride-tetrafluoroethylene copolymer, polytetrafluoroethylene, polypropylene, polyethylene, polybutadiene, polyacrylic acid, polyacrylic ester, polystyrene, polyacrylonitrile, polyimide, polyamide-imide or the like may be used. Also, the binder may be a mixture, a copolymer or a cross-linked body of a plurality of the above resins, for example, styrene butadiene rubber (SBR). When an aqueous binder such as an SBR emulsion is used, a thickener such as carboxymethyl cellulose (CMC) can also be used. The amount of the negative electrode binder is preferably 0.5 to 20 parts by weight based on 100 parts by weight of the active material from the viewpoint of sufficient binding strength and high energy density that are in a trade-off relation with each other.

For the negative electrode mixture layer, a conductive assisting agent may be added for the purpose of lowering the impedance. Examples of the conductive assisting agent include, flake-like, soot, and fibrous carbon fine particles and the like, for example, graphite, carbon black, acetylene black, vapor grown carbon fibers and the like.

As the negative electrode current collector, from the viewpoint of electrochemical stability, aluminum, nickel, stainless steel, chrome, copper, silver, or an alloy thereof may be used. As the shape thereof, foil, flat plate, mesh and the like are exemplified.

The negative electrode according to the present embodiment may be prepared, for example, by preparing a negative electrode mixture slurry comprising the negative electrode active material, the binder and a solvent and applying this to the negative electrode current collector to form the negative electrode mixture layer. Examples of a method for forming the negative electrode mixture layer include a doctor blade method, a die coater method, a CVD method, a sputtering method, and the like. After forming the negative electrode mixture layer in advance, a thin film of aluminum, nickel or an alloy thereof as a negative electrode current collector may be formed thereon by a method such as vapor deposition or sputtering, to prepare a negative electrode.

<Electrolyte Solution>

The electrolyte solution comprises a non-aqueous solvent and a supporting salt. Examples of the non-aqueous solvent include, but not particularly limited to, aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), methyl ethyl carbonate (MEC) and dipropyl carbonate (DPC); propylene carbonate derivatives; aliphatic carboxylic acid esters such as methyl formate, methyl acetate and ethyl propionate; ethers such as diethyl ether and ethyl propyl ether; phosphoric acid esters such as trimethyl phosphate, triethyl phosphate, tripropyl phosphate, trioctyl phosphate and triphenyl phosphate; and fluorinated aprotic organic solvents obtainable by substituting at least part of hydrogen atoms of these compounds with fluorine atom(s); and the like.

Among them, cyclic or open-chain carbonate(s) such as ethylene carbonate (EC), propylene carbonate (PC), butylene carbonate (BC), dimethyl carbonate (DMC), diethyl carbonate (DEC), methyl ethyl carbonate (MEC), dipropyl carbonate (DPC) or the like is preferably contained.

The non-aqueous solvents may be used alone, or in combination of two or more.

The supporting salt is not particularly limited except that it comprises Li. Examples of the supporting salt include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, $LiN(FSO_2)_2$, $LiN(CF_3SO_2)_2$, $LiN(C_2F_5SO_2)_2$, $LiB_{10}Cl_{10}$ and the like. Besides these, the supporting salt includes lower aliphatic lithium carboxylate, chloroboran lithium, lithium tetraphenylborate, LiBr, LiI, LiSCN, LiCl and the like. The supporting salts may be used alone or in combination of two or more.

The concentration of the supporting salt in the electrolyte solution is preferably 0.5 to 1.5 mol/l. When the concentration of the supporting salt is within this range, density, viscosity and electrical conductivity are easily adjusted to appropriate ranges.

The electrolyte solution may further contain an additive. The additive is not particularly limited, and examples thereof include halogenated cyclic carbonates, unsaturated cyclic carbonates, cyclic or open-chain disulfonic acid esters, and the like. These compounds can improve battery characteristics such as cycle characteristics. This is presumably because these additives decompose during charge/discharge of the lithium ion secondary battery to form a film on the surface of an electrode active material, which prevents decomposition of the electrolyte solution and the supporting salt.

<Separator>

The separator may be of any type as long as it has durability against the electrolyte solution. Specific examples of a material thereof include polyolefins such as polypropylene and polyethylene, cellulose, polyesters such as polyethylene terephthalate and polybutylene terephthalate, polyimide, polyamide-imide, polyvinylidene fluoride, aromatic polyamides (aramid) such as polymetaphenylene isophthalamide, polyparaphenylene terephthalamide and copolyparaphenylene 3,4'-oxydiphenylene terephthalamide, and the like. These can be used as porous films, woven fabrics, nonwoven fabrics or the like.

<Insulation Layer>

An insulation layer may be formed on a surface of the positive electrode, the negative electrode and the separator. Examples of a method for forming the insulation layer include a doctor blade method, a die coater method, a CVD method, a sputtering method, and the like. The insulation layer may be formed at the same time as forming the positive electrode mixture layer, negative electrode mixture layer or separator. Materials constituting the insulation layer include a mixture of an insulating filler such as aluminum oxide or barium titanate and a binder such as styrene butadiene rubber or polyvinylidene fluoride.

<Structure of Secondary Battery>

Figure 1:
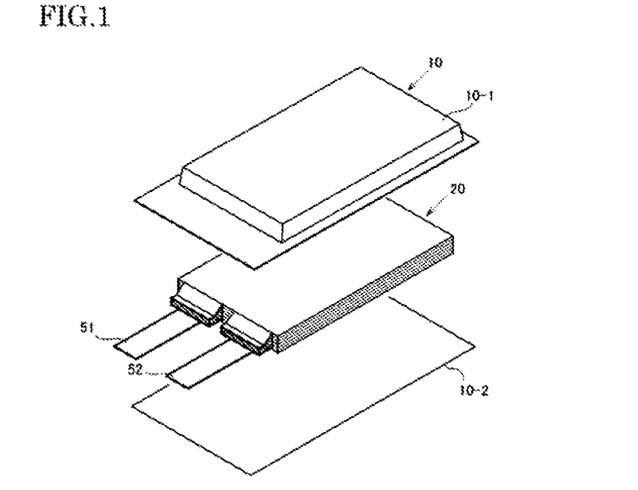
FIG. 1 is an exploded perspective view showing a basic structure of a film package battery.
Figure 2:
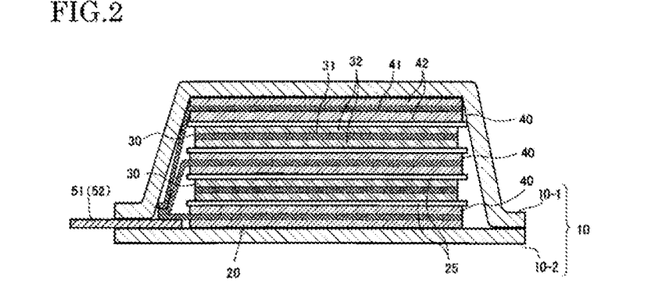
FIG. 2 is a cross-sectional view schematically showing a cross section of the battery of FIG. 1.

The lithium ion secondary battery according to the present embodiment may have, for example, a structure as shown in FIGS. 1 and 2. This secondary battery comprises a battery element 20, a film outer package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

As shown in FIGS. 1 and 2, the lithium ion secondary battery according to the present embodiment may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film outer package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film outer package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

<Method for Manufacturing Secondary Battery>

The lithium ion secondary battery according to the present embodiment can be manufactured by a conventional method. An example of a method for manufacturing a secondary battery will be described taking a stacked laminate type secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the secondary battery.

<Assembled Battery>

A plurality of the lithium ion secondary batteries according to the present embodiment may be combined to form an assembled battery. The assembled battery may be configured by connecting two or more lithium ion secondary batteries according to the present embodiment in series or in parallel or in combination of both. The connection in series and/or parallel makes it possible to adjust the capacitance and voltage freely. The number of the lithium ion secondary batteries included in the assembled battery can be set appropriately according to the battery capacity and output.

<Vehicle>

The lithium ion secondary battery or the assembled battery according to the present embodiment can be used in vehicles. Vehicles according to the present embodiment include hybrid vehicles, fuel cell vehicles, electric vehicles (besides four-wheel vehicles (cars, commercial vehicles such as trucks and buses, light automobiles, etc.), two-wheeled vehicle (bike) and tricycle), and the like. The vehicles according to the present embodiment are not limited to automobiles, and the battery may be used as a variety of power source of other vehicles, such as a moving body like a train, a ship, a submarine and a satellite.

Examples

In each example, a lithium ion secondary battery was produced and evaluated as follows.

(Positive Electrode)

A positive electrode active material (a layered lithium-nickel composite oxide containing alkali components), a conductive assisting agent and a binder were uniformly mixed to prepare a positive electrode mixture as shown in Table 1. The prepared positive electrode mixture was dispersed in N-methyl-2-pyrrolidone (NMP) to prepare a positive electrode mixture slurry. The positive electrode mixture slurry was applied onto an aluminum foil and dried, and then the coating film was pressed with a roll press to adjust the density of the positive electrode mixture layer to 3.65 g/cm$^3$.

(Negative Electrode)

Silicon oxide (SiO) in which the surface was coated with carbon and artificial graphite were used as a negative electrode active material. The weight ratio of the silicon oxide and the artificial graphite in the negative electrode was set to be SiO/artificial graphite=70/30. Carbon black having a specific surface area of 45 m$^2$/g was used as a conductive assisting agent. A polyacrylate was used as a negative electrode binder. These were uniformly mixed such that the weight ratio of the negative electrode materials was the negative electrode active material (SiO and artificial graphite)/carbon black/polyacrylate=88/5/7, and thus a negative electrode mixture was prepared. The prepared negative electrode mixture was dispersed in water (ion exchanged water) to prepare a negative electrode mixture slurry. The negative electrode mixture slurry was applied onto a copper foil and dried, and then the coating film was pressed with a roll press to adjust the density of the negative electrode mixture layer to 1.45 g/cm$^3$.

(Electrolyte Solution)

A mixed solvent of ethylene carbonate (EC), diethyl carbonate (DEC) and methyl ethyl carbonate (MEC) was used as an electrolyte solvent. The volume ratio of the solvents was EC/DEC/MEC=30/60/10. LiPF$_6$ as a supporting salt and fluoroethylene carbonate (FEC) as an additive were added to the mixed solvent to prepare an electrolyte solution. The concentration of LiPF$_6$ in the electrolyte solution was 0.9 mol/l. The concentration of FEC in the electrolyte solution was 2.67 weight %.

(Assembly of Secondary Battery)

The obtained positive electrode was cut into 2.8 cm×2.6 cm, and the obtained negative electrode was cut into 3.0 cm×2.8 cm. The both surfaces of the positive electrode was covered with a 3.2 cm×3.2 cm polypropylene separator coated with an alumina-containing insulating layer (3 μm thick), the negative electrode was disposed thereon such that the negative electrode mixture layer faced the positive electrode mixture layer, and thus an electrode stack was produced. Next, the electrode stack was sandwiched with two 5 cm×6 cm aluminum laminate films, the three sides excluding one long side were heat sealed with a seal width of 8 mm. After injecting the electrolyte solution, the remaining one side was heat sealed, and thus a laminate cell type battery was produced.

(Viscosity of Positive Electrode Mixture Slurry)

After allowing the positive electrode mixture slurry to stand for 18 hours, the viscosity of the slurry was measured with a Brookfield B-type rotary viscometer to check a rise in viscosity. Results are shown in Table 1.

(Quantitation of Alkali Components)

The positive electrode mixture layer was scratched from the produced positive electrode. The positive electrode mixture was dispersed in water to extract the alkali components, and quantitative analysis was performed. The total content of LiOH and Li$_2$CO$_3$ was determined by a titration method. Carbonate ions were quantified by ion chromatography to determine the content of Li$_2$CO$_3$. Furthermore, the content of LiOH was determined based on these. Results are shown in Table 1.

(Quantitation of Chlorine)

The positive electrode mixture layer was scratched from the produced positive electrode, and the amount of chlorine contained in the positive electrode mixture was measured by combustion ion chromatography. Results are shown in Table 1.

(Initial Charge Capacity Test)

First, charging was performed at room temperature. Charging was performed by CCCV method. The battery was charged for 10 hours at a charging rate of 0.2 C (1 C=100 mA), and the charge cut-off voltage was 4.2 V. The charge capacity at this time was defined as initial charge capacity.

(Capacity Retention Rate)

A charge-discharge cycle test was performed 150 times at room temperature. In the charging, 1 C-constant current charging was carried out until the upper limit voltage of 4.2 V, and a 4.2 V-constant voltage charging was successively carried out, for a total time of charging of 2.5 hours. In discharging, a 1 C-constant current discharging was carried out until 2.5 V. The ratio of the 150th cycle discharge capacity to the 1$^{st}$ cycle discharge capacity was determined as a capacity retention rate. Results are shown in Table 1.

(Measurement Test of Aging Efficiency)

First the battery whose initial charge capacity had been measured was allowed to stand for 18 days in a constant temperature bath kept at 45° C. The battery was taken out from the constant temperature bath, discharged at 1 C (1 C=100 mA) to 2.5 V, charged at 1 C (1 C=100 mA) to 4.2 V, and then discharged to 2.5 V at discharge rates of 1 C (1 C=100 mA), 0.5 C (1 C=100 mA) and 0.2 C (1 C=100 mA) in order. The aging efficiency (0.2 C discharge capacity after aging/initial charge capacity×100) (%) was determined from the obtained results. Results are shown in Table 1.

TABLE 1

| | Positive electrode active material | | Binder (wt %) | | | | Conductive assisting agent | |
|---|---|---|---|---|---|---|---|---|
| | Type | Amount (wt %) | PVdF | PVdF-HFP | PVdF-CTFE | Total | Type | Amount (wt %) |
| Comparative example 1 | NCA | 96.0 | 0 | 2.47 | 0.03 | 2.5 | Carbon black | 1.5 |
| Comparative example 2 | NCA | 96.0 | 0 | 2.40 | 0.10 | 2.5 | Carbon black | 1.5 |
| Comparative example 3 | NCA | 96.0 | 0 | 2.20 | 0.30 | 2.5 | Carbon black | 1.5 |

TABLE 1-continued

| | | | | | | | | |
|---|---|---|---|---|---|---|---|---|
| Comparative example 4 | NCA | 96.0 | 2.00 | 0 | 0.50 | 2.5 | Carbon black | 1.5 |
| Comparative example 5 | NCA | 96.0 | 0 | 1.95 | 0.55 | 2.5 | Carbon black | 1.5 |
| Comparative example 6 | NCA | 96.0 | 0 | 1.50 | 1.00 | 2.5 | Carbon black | 1.5 |
| Comparative example 7 | NCA | 96.0 | 0 | 2.47 | 0.03 | 2.5 | Carbon black | 1.5 |
| Example 1 | NCA | 96.0 | 0 | 2.45 | 0.05 | 2.5 | Carbon black | 1.5 |
| Example 2 | NCM811 | 96.0 | 0 | 2.40 | 0.10 | 2.5 | Carbon black | 1.5 |
| Example 3 | NCA | 96.0 | 2.30 | 0 | 0.20 | 2.5 | Carbon black | 1.5 |
| Example 4 | NCA | 96.5 | 0 | 2.20 | 0.30 | 2.5 | Carbon nanotube | 1.0 |
| Example 5 | NCM811 | 96.5 | 0 | 2.05 | 0.45 | 2.5 | Carbon nanotube | 1.0 |
| Example 6 | NCA | 96.0 | 0 | 2.00 | 0.50 | 2.5 | Carbon black | 1.5 |
| Comparative example 8 | NCA | 96.5 | 0 | 1.95 | 0.55 | 2.5 | Carbon black | 1.0 |
| Comparative example 9 | NCA | 96.0 | 0 | 1.50 | 1.00 | 2.5 | Carbon black | 1.5 |
| Example 7 | NCA | 96.0 | 0 | 1.95 | 0.05 | 2.0 | Plate-like graphite | 2.0 |
| Example 8 | NCM811 | 96.0 | 1.90 | 0 | 0.10 | 2.0 | Plate-like graphite | 2.0 |
| Example 9 | NCA | 96.0 | 0 | 1.80 | 0.20 | 2.0 | Plate-like graphite | 2.0 |
| Example 10 | NCA | 96.0 | 0 | 1.70 | 0.30 | 2.0 | Plate-like graphite | 2.0 |
| Example 11 | NCA | 96.0 | 0 | 1.55 | 0.45 | 2.0 | Plate-like graphite | 2.0 |
| Example 12 | NCA | 96.0 | 0 | 1.50 | 0.50 | 2.0 | Plate-like graphite | 2.0 |
| Comparative example 10 | NCA | 96.5 | 0 | 0.95 | 0.55 | 1.5 | Plate-like graphite | 2.0 |
| Comparative example 11 | NCA | 96.5 | 0 | 0.50 | 1.00 | 1.5 | Plate-like graphite | 2.0 |
| Example 13 | NCA | 97.0 | 0 | 1.45 | 0.05 | 1.5 | Carbon black | 1.5 |
| Example 14 | NCM811 | 98.0 | 0 | 1.40 | 0.10 | 1.5 | Carbon nanotube | 0.5 |
| Example 15 | NCA | 98.0 | 0 | 1.30 | 0.20 | 1.5 | Carbon nanotube | 0.5 |
| Example 16 | NCA | 97.5 | 1.20 | 0 | 0.30 | 1.5 | Carbon black | 1.0 |
| Example 17 | NCA | 98.0 | 0 | 1.05 | 0.45 | 1.5 | Carbon nanotube | 0.5 |
| Example 18 | NCA | 97.5 | 0 | 1.00 | 0.50 | 1.5 | Carbon black | 1.0 |
| Comparative example 12 | NCA | 97.5 | 0 | 0.95 | 0.55 | 1.5 | Carbon black | 1.0 |
| Example 19 | NCA | 98.5 | 0 | 0.95 | 0.05 | 1.0 | Carbon nanotube | 0.5 |
| Example 20 | NCA | 98.5 | 0.90 | 0 | 0.10 | 1.0 | Carbon nanotube | 0.5 |
| Example 21 | NCA | 98.5 | 0 | 0.80 | 0.20 | 1.0 | Carbon black | 0.5 |
| Example 22 | NVM811 | 98.5 | 0 | 0.70 | 0.30 | 1.0 | Carbon nanotube | 0.5 |
| Example 23 | NCA | 98.5 | 0 | 0.55 | 0.45 | 1.0 | Ketjenblack | 0.5 |
| Example 24 | NCA | 98.5 | 0.50 | 0 | 0.50 | 1.0 | Carbon nanotube | 0.5 |
| Comparative example 13 | NCA | 98.5 | 0 | 0.45 | 0.55 | 1.0 | Carbon nanotube | 0.5 |
| Comparative example 14 | NCA | 99.3 | 0 | 0.42 | 0.03 | 0.45 | Carbon black | 0.3 |
| Example 25 | NCA | 99.3 | 0 | 0.40 | 0.05 | 0.45 | Carbon black | 0.3 |
| Example 26 | NCA | 99.3 | 0 | 0.35 | 0.10 | 0.45 | Carbon black | 0.3 |
| Example 27 | NCA | 99.3 | 0 | 0.25 | 0.20 | 0.45 | Carbon black | 0.3 |
| Example 28 | NCA | 99.3 | 0 | 0.20 | 0.25 | 0.45 | Carbon black | 0.3 |
| Example 29 | NCA | 99.3 | 0 | 0.15 | 0.30 | 0.45 | Carbon black | 0.3 |
| Example 30 | NCA | 99.3 | 0 | 0.10 | 0.35 | 0.45 | Carbon black | 0.3 |
| Example 31 | NCA | 99.3 | 0 | 0.05 | 0.40 | 0.45 | Carbon black | 0.3 |

| | Alkali components (wt %) | | | Chlorine (µg/g) | Rise in viscosity | Capacity retention rate (%) | Aging efficiency (%) |
|---|---|---|---|---|---|---|---|
| | LiOH | $Li_2CO_3$ | Total | | | | |
| Comparative example 1 | 0.09 | 0.09 | 0.18 | 26 | Observed | Rapid capacity deterioration | 63 |

TABLE 1-continued

| | | | | | | | |
|---|---|---|---|---|---|---|---|
| Comparative example 2 | 0.1 | 2.2 | 2.3 | 40 | Observed | Rapid capacity deterioration | 64 |
| Comparative example 3 | 2.2 | 0.1 | 2.3 | 80 | Observed | Rapid capacity deterioration | 65 |
| Comparative example 4 | 2.2 | 2.2 | 4.4 | 120 | Observed | Rapid capacity deterioration | 64 |
| Comparative example 5 | 2.2 | 2.5 | 4.7 | 130 | Observed | Rapid capacity deterioration | 63 |
| Comparative example 6 | 2.2 | 2.6 | 4.8 | 220 | Observed | Rapid capacity deterioration | 63 |
| Comparative example 7 | 0.7 | 0.6 | 1.3 | 26 | Not observed | 80 | 66 |
| Example 1 | 0.7 | 0.6 | 1.3 | 30 | Not observed | 88 | 70 |
| Example 2 | 0.5 | 0.5 | 1.0 | 40 | Not observed | 89 | 71 |
| Example 3 | 0.7 | 0.6 | 1.3 | 60 | Not observed | 91 | 72 |
| Example 4 | 0.7 | 0.6 | 1.3 | 80 | Not observed | 93 | 73 |
| Example 5 | 0.5 | 0.5 | 1.0 | 110 | Not observed | 91 | 71 |
| Example 6 | 0.7 | 0.6 | 1.3 | 120 | Not observed | 90 | 70 |
| Comparative example 8 | 0.7 | 0.6 | 1.3 | 130 | Not observed | 80 | 66 |
| Comparative example 9 | 0.7 | 0.6 | 1.3 | 220 | Not observed | 70 | 65 |
| Example 7 | 0.7 | 0.6 | 1.3 | 30 | Not observed | 86 | 70 |
| Example 8 | 0.5 | 0.5 | 1.0 | 40 | Not observed | 87 | 71 |
| Example 9 | 0.7 | 0.6 | 1.3 | 60 | Not observed | 88 | 72 |
| Example 10 | 0.7 | 0.6 | 1.3 | 80 | Not observed | 89 | 73 |
| Example 11 | 0.7 | 0.6 | 1.3 | 110 | Not observed | 87 | 71 |
| Example 12 | 0.7 | 0.6 | 1.3 | 120 | Not observed | 86 | 70 |
| Comparative example 10 | 0.7 | 0.6 | 1.3 | 130 | Not observed | 75 | 66 |
| Comparative example 11 | 0.7 | 0.6 | 1.3 | 220 | Not observed | 70 | 65 |
| Example 13 | 0.7 | 0.6 | 1.3 | 30 | Not observed | 87 | 72 |
| Example 14 | 0.5 | 0.5 | 1.0 | 40 | Not observed | 88 | 73 |
| Example 15 | 0.7 | 0.6 | 1.3 | 60 | Not observed | 89 | 74 |
| Example 16 | 0.7 | 0.6 | 1.3 | 80 | Not observed | 90 | 75 |
| Example 17 | 0.7 | 0.6 | 1.3 | 110 | Not observed | 88 | 74 |
| Example 18 | 0.7 | 0.6 | 1.3 | 120 | Not observed | 87 | 74 |
| Comparative example 12 | 0.7 | 0.6 | 1.3 | 130 | Not observed | 70 | 64 |
| Example 19 | 0.1 | 0.2 | 0.3 | 30 | Not observed | 83 | 72 |
| Example 20 | 0.1 | 0.2 | 0.3 | 40 | Not observed | 84 | 73 |
| Example 21 | 0.1 | 0.2 | 0.3 | 60 | Not observed | 85 | 74 |
| Example 22 | 0.1 | 0.2 | 0.3 | 80 | Not observed | 86 | 75 |
| Example 23 | 0.1 | 0.2 | 0.3 | 110 | Not observed | 85 | 74 |
| Example 24 | 0.1 | 0.2 | 0.3 | 120 | Not observed | 84 | 74 |
| Comparative example 13 | 0.1 | 0.2 | 0.3 | 130 | Not observed | 70 | 68 |
| Comparative example 14 | 0.1 | 0.2 | 0.3 | 26 | Not observed | 70 | 70 |
| Example 25 | 0.1 | 0.2 | 0.3 | 30 | Not observed | 71 | 72 |
| Example 26 | 0.1 | 0.2 | 0.3 | 40 | Not observed | 71 | 73 |
| Example 27 | 0.1 | 0.2 | 0.3 | 60 | Not observed | 72 | 74 |
| Example 28 | 0.1 | 0.2 | 0.3 | 70 | Not observed | 71 | 75 |
| Example 29 | 0.1 | 0.2 | 0.3 | 80 | Not observed | 71 | 74 |
| Example 30 | 0.1 | 0.2 | 0.3 | 90 | Not observed | 70 | 74 |
| Example 31 | 0.1 | 0.2 | 0.3 | 100 | Not observed | 68 | 66 |

Abbreviations in Table 1 have the following meanings.

NCA: layered lithium-nickel composite oxide $(LiNi_{0.8}Co_{0.15}Al_{0.05}O_2)$

NCM811: layered lithium-nickel composite oxide $(LiNi_{0.8}Co_{0.1}Mn_{0.1}O_2)$ PVdF: polyvinylidene fluoride PVdF-HFP: vinylidene fluoride-hexafluoropropylene copolymer PVdF-CTFE: vinylidene fluoride-chlorotrifluoroethylene copolymer The specific surface area and particle size of each material of Table 1 are as follows.

TABLE 2

| | Specific surface area | 50% Particle size |
|---|---|---|
| NCA | 0.5 m$^2$/g | 6.5 μm |
| NCM811 | 0.6 m$^2$/g | 6.2 μm |
| Carbon black | 65 m$^2$/g | 40 nm |
| Carbon nanotube | 150 m$^2$/g | 15 nm* |
| Plate-like graphite | 20 m$^2$/g | 3.4 μm |
| Ketjenblack | 800 m$^2$/g | 35 nm |

*The average diameter of carbon nanotubes

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The lithium ion secondary battery according to the present embodiment can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF SYMBOLS 10 film outer package
20 battery element
25 separator
30 positive electrode
40 negative electrode

The invention claimed is:

1. A lithium ion secondary battery comprising:
a positive electrode,
a negative electrode, and
an electrolyte solution, wherein
the positive electrode has a positive electrode mixture layer comprising:
a layered lithium-nickel composite oxide in which a proportion of nickel in metals other than lithium is 80 mol % or more;
LiOH;
$Li_2CO_3$;
a chlorine-free polyvinylidene fluoride-based polymer; and
a chlorine-containing polyvinylidene fluoride-based polymer,
wherein a content of LiOH in the positive electrode mixture layer and a content of $Li_2CO_3$ in the positive electrode mixture layer are each 0.1 weight % or more and 2.1 weight % or less, a total content of LiOH and $Li_2CO_3$ in the positive electrode mixture layer is 0.2 weight% or more and 4.2 weight % less, and a content of chlorine in the positive electrode mixture layer is 30 µg/g or more and 120 µg/g or less,
the amount of the chlorine-containing polyvinylidene fluoride-based polymer is 0.10 weight % or more to 0.45 weight % or less of the positive electrode mixture layer,
a total content of the chlorine-containing polyvinylidene fluoride-based polymer and the chlorine-free polyvinylidene fluoride-based polymer in the positive electrode mixture layer is 1.5 weight % or more and 2.5 weight % or less, and
the negative electrode comprises silicon oxide having a surface coated with carbon.

2. The lithium ion secondary battery according to claim 1, wherein the layered lithium-nickel composite oxide is represented by the following formula, $Li_yNi_{(1-x)}M_xO_2$
wherein $0 \leq x \leq 0.2$, $0 < y \leq 1.2$, and M is at least one element selected from the group consisting of Co, Al and Mn.

3. The lithium ion secondary battery according to claim 1, wherein a density of the positive electrode mixture layer is 3.45 g/cm$^3$ or more and 4.0 g/c$^3$ or less.

4. The lithium ion secondary battery according to claim 1, wherein the positive electrode mixture layer comprises a carbon black having an average primary particle size of 20 nm or more and 80 nm or less and a specific surface area of 25 m$^2$/g or more and 400 m$^2$/g or less in an amount of 0.1 weight % or more and 2.0 weight % or less.

5. The lithium ion secondary battery according to claim 1, wherein the positive electrode mixture layer comprises a carbon nanotube having an average diameter of 5 nm or more and 40 nm or less and a specific surface area of 100 m$^2$/g or more and 400 m$^2$/g or less in an amount of 0.03 weight % or more and 2.0 weight % or less.

6. The lithium ion secondary battery according to claim 1, wherein the positive electrode mixture layer comprises a plate-like graphite having an average primary particle size of 1 µm or more and 6 µm or less and a specific surface area of 10m$^2$/g or more and 40 m$^2$/g or less in an amount of 0.03 weight% or more and 2.0 weight % or less.

7. The lithium ion secondary battery according to claim 1, wherein the positive electrode mixture layer comprises a ketjenblack having an average primary particle size of 35 nm or more and 45 nm or less and a specific surface area of 750 m$^2$/g or more and 850 m$^2$/g or less in an amount of 0.1 weight % or more and 2.0 weight % or less.

8. The lithium ion secondary battery according to claim 1, wherein the positive electrode mixed layer comprises a conductive assisting agent in an amount of 0.03 weight % or more and 2.5 weight % or less.

9. The lithium ion secondary battery according to claim 8, wherein the conductive assisting agent is one or more selected from the group consisting of:
a carbon black having an average primary particle size of 20 nm or more and 80 nm or less and a specific surface area of 25 m$^2$/g or more and 400 m$^2$/g or less in an amount of 0.1 weight % or more and 2.0 weight % or less,
a carbon nanotube having an average diameter of 5 nm or more and 40 nm or less and a specific surface area of 100 m$^2$/g or more and 400 m$^2$/g or less in an amount of 0.03 weight % or more and 2.0 weight % or less,
a plate-like graphite having an average primary particle size of 1 µm or more and 6 µm or less and a specific surface area of 10 m$^2$/g or more and 40 m$^2$/g or less in an amount of 0.03 weight % or more and 2.0 weight % or less, and
a ketjenblack having an average primary particle size of 35 nm or more and 45 nm or less and a specific surface area of 750 m$^2$/g or more and 850 m$^2$/g or less in an amount of 0.1 weight % or more and 2.0 weight % or less.

10. The lithium ion secondary battery according to claim 1, wherein the electrolyte solution comprises fluoroethylene carbonate.

11. The lithium ion secondary battery according to claim 1, wherein an amount of the silicon oxide having a surface coated with carbon is 10 weight % or more based on the total amount of the negative electrode active material.

12. The lithium ion secondary battery according to claim 1, wherein the chlorine-free polyvinylidene fluoride-based polymer does not comprise polyvinylidene fluoride (PVdF).

13. The lithium ion secondary battery according to claim 1, wherein the positive electrode mixture layer does not include polyvinylidene fluoride (PVdF).

14. A method for manufacturing a lithium ion secondary battery, comprising the steps of:
- fabricating an electrode element by stacking a positive electrode and a negative electrode via a separator, and enclosing the electrode element and an electrolyte solution into an outer package,
- wherein the positive electrode has a positive electrode mixture layer comprising:
  - a layered lithium-nickel composite oxide in which a proportion of nickel in metals other than lithium is 80 mol % or more;
  - LiOH;
  - $Li_2CO_3$;
  - a chlorine-free polyvinylidene fluoride-based polymer; and
  - a chlorine-containing polyvinylidene fluoride-based polymer,
- a content of LiOH in the positive electrode mixture layer and a content of $Li_2CO_3$ in the positive electrode mixture layer are each 0.1 weight % or more and 2.1 weight % or less, a total content of LiOH and $Li_2CO_3$ in the positive electrode mixture layer is 0.2 weight % or more and 4.2 weight % less, and a content of chlorine in the positive electrode mixture layer is 30 µg/g or more and 120 µg/g or less,
- an amount of the chlorine-containing polyvinylidene fluoride-based polymer is 0.10 weight % or more to 0.45 weight % or less of the positive electrode mixture layer,
- a total content of the chlorine-containing polyvinylidene fluoride-based polymer and the chlorine-free polyvinylidene fluoride-based polymer in the positive electrode mixture layer is 1.5 weight % or more and 2.5 weight % or less, and
- the negative electrode comprises silicon oxide having a surface coated with carbon.

15. The lithium ion secondary battery according to claim 14, wherein the chlorine-free polyvinylidene fluoride-based polymer is vinylidene fluoride-hexafluoropropylene copolymer.

* * * * *